United States Patent
Thomas et al.

(10) Patent No.: US 10,927,689 B2
(45) Date of Patent: Feb. 23, 2021

(54) TURBINE VANE ASSEMBLY WITH CERAMIC MATRIX COMPOSITE COMPONENTS MOUNTED TO CASE

(71) Applicants: Rolls-Royce Corporation, Indianapolis, IN (US); Rolls-Royce North American Technologies Inc., Indianapolis, IN (US)

(72) Inventors: David J. Thomas, Brownsburg, IN (US); Aaron D. Sippel, Zionsville, IN (US); Ted J. Freeman, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 153 days.

(21) Appl. No.: 16/119,388

(22) Filed: Aug. 31, 2018

(65) Prior Publication Data

US 2020/0072066 A1    Mar. 5, 2020

(51) Int. Cl.
*F01D 9/04* (2006.01)
*F01D 25/24* (2006.01)
*F01D 25/00* (2006.01)

(52) U.S. Cl.
CPC .......... *F01D 9/041* (2013.01); *F01D 25/005* (2013.01); *F01D 25/243* (2013.01); *F05D 2220/32* (2013.01); *F05D 2230/53* (2013.01); *F05D 2240/12* (2013.01); *F05D 2240/15* (2013.01); *F05D 2300/6033* (2013.01)

(58) Field of Classification Search
CPC .......... F01D 5/188; F01D 5/189; F01D 5/284
See application file for complete search history.

(56) References Cited

U.S. PATENT DOCUMENTS

| | | | |
|---|---|---|---|
| 4,786,234 A | 11/1988 | Readnour | |
| 5,545,002 A | 8/1996 | Bourguignon et al. | |
| 5,630,700 A * | 5/1997 | Olsen | F01L 35/189 415/134 |
| 6,325,593 B1 * | 12/2001 | Darkins, Jr. | F01D 5/186 415/115 |
| 7,621,718 B1 | 11/2009 | Liang | |
| 9,322,285 B2 | 4/2016 | Devore et al. | |
| 9,915,159 B2 * | 3/2018 | Huizenga | F01D 9/047 |
| 10,309,240 B2 * | 6/2019 | Heitman | F01D 25/243 |
| 10,400,616 B2 * | 9/2019 | Tuertscher | F01D 9/044 |
| 2011/0297344 A1 | 12/2011 | Campbell et al. | |
| 2016/0222822 A1 | 8/2016 | Jennings | |

* cited by examiner

*Primary Examiner* — Justin D Seabe
(74) *Attorney, Agent, or Firm* — Barnes & Thornburg LLP (57) ABSTRACT

A vane assembly for a gas turbine engine is provided having an outer casing and an inner casing radially spaced apart from the outer casing. An airfoil extends radially between the outer casing and the inner casing. The airfoil includes a spar having an outer endwall positioned adjacent the outer casing and an inner endwall positioned adjacent the inner casing. A pressure side and a suction side extend between the inner endwall and the outer endwall. A ceramic matrix composite cover has a pressure side extending along the pressure side of the spar and a suction side extending along the suction side of the spar.

19 Claims, 6 Drawing Sheets

TURBINE VANE ASSEMBLY WITH CERAMIC MATRIX COMPOSITE COMPONENTS MOUNTED TO CASE

FIELD OF THE DISCLOSURE

The present disclosure relates generally to components for turbomachinery, and more specifically to high temperature components for turbomachinery such as gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Vane assemblies are static components including airfoils for redirecting and smoothing airflow through the engine. To withstand heat from the combustion products received from the combustor, the engine may include vane assembly structures made from ceramic-matrix composite materials that are able to interact with the hot flows. In some vane assemblies, the vane includes ceramic matrix composite (CMC) material that provides a heat shield for other parts of the assembly. The CMC material enables the reduction of cooling air usage, an increase in turbine entry temperatures, weight savings, and an overall increase in turbine efficiency.

Aero loads in the turbine vane typically transfer from the vane to the outer endwall and finally to the case structure. In going from the vane to the endwall, the load must transfer through the transition geometry. This may result in tensile stresses near where the vane leading edge intersects the outer endwall at the leading edge and along the pressure side. A fillet may be utilized to manage the stress magnitude. CMCs have a lower design stress than metals, thereby making the load transfer a design challenge. However, CMCs have a higher allowable stress limit in compression on the suction side of the vane.

SUMMARY

The present disclosure may comprise one or more of the following features and combinations thereof.

According to one aspect of the present disclosure, a turbine vane assembly for a gas turbine engine includes a turbine vane support made from metallic materials. The turbine vane support includes an outer mount panel that extends at least partway around a central axis and a load transfer flange that extends radially-inwardly from the outer mount panel. A gas path heat shield made from ceramic matrix composite materials is provided. The gas path heat shield includes an airfoil having a pressure side wall and a suction side wall. An end wall has a pressure side portion that extends circumferentially from the pressure side wall of the airfoil and a suction side portion that extends circumferentially from the suction side wall of the airfoil. The suction side portion of the end wall is a thickened suction side portion with a radially-measured thickness greater than the pressure side portion of the end wall. The thickened suction side portion of the endwall included in the gas path heat shield engages the load transfer flange of the turbine vane support to provide an aero-load transfer interface configured to carry circumferentially directed aerodynamic loads applied to the pressure side wall of the airfoil from the gas path heat shield to the turbine vane support.

In the illustrative embodiments, the suction side wall included in the airfoil has a circumferential thickness greater than a circumferential thickness of the pressure side wall included in the airfoil. The airfoil and the outer end wall of the gas path heat shield are co-infiltrated with ceramic matrix material such that the gas path heat shield is a one piece, integral component. The turbine vane support includes a spar that extends radially-inwardly from the mount panel through the gas path heat shield.

In the illustrative embodiments, a pressure side fillet extends between the pressure side wall of the airfoil and the pressure portion of the endwall. A suction side fillet extends between the suction side wall of the airfoil and the suction portion of the endwall. The suction side fillet is a thickened fillet with a angularly-measured thickness greater than the pressure side fillet. The angularly-measured thickness is measured at an angle between a circumferential direction and a radial direction.

In the illustrative embodiments, a locating pad extends radially-inwardly from the outer mount panel and engages a radially-outward surface of the suction side portion of the end wall.

In the illustrative embodiments, a flange protector extends circumferentially from the gas path heat shield. The flange protector may extend circumferentially from the pressure side portion of the endwall and may be configured to engage the load transfer flange of an adjacent turbine vane assembly. The flange protector has a circumferential thickness less than a circumferential thickness of the pressure side portion of the endwall. The flange protector may extend circumferentially from the pressure side wall of the airfoil and may be configured to engage the flange protector of an adjacent turbine vane assembly.

According to another aspect of the present disclosure, a turbine vane assembly for a gas turbine engine includes a turbine vane support made from metallic materials. The turbine vane support includes an outer mount panel that extends at least partway around a central axis. A gas path heat shield made from ceramic matrix composite materials is provided. The gas path heat shield includes an airfoil having a pressure side wall and a suction side wall. The suction side wall has a circumferential thickness greater than a circumferential thickness of the pressure side wall. An end wall has a pressure side portion that extends circumferentially from the pressure side wall of the airfoil and a suction side portion that extends circumferentially from the suction side wall of the airfoil. The suction side portion of the end wall is a thickened suction side portion with a radially-measured thickness greater than the pressure side portion of the end wall. A spar extends radially-inwardly from the mount panel through the gas path heat shield.

In the illustrative embodiments, the airfoil and the outer end wall of the gas path heat shield are co-infiltrated with ceramic matrix material such that the gas path heat shield is a one piece, integral component.

In the illustrative embodiments, a pressure side fillet extends between the pressure side wall of the airfoil and the pressure portion of the endwall. A suction side fillet extends between the suction side wall of the airfoil and the suction portion of the endwall. The suction side fillet is a thickened fillet with an angularly-measured thickness greater than the pressure side fillet. The angularly-measured thickness is measured at an angle between a circumferential direction and a radial direction.

In the illustrative embodiments, a locating pad extends radially-inwardly from the outer mount panel and engages a radially-outward surface of the suction side portion of the end wall.

In the illustrative embodiments, a flange protector extends circumferentially from the gas path heat shield. The flange protector may have a circumferential thickness less than a circumferential thickness of the pressure side portion of the endwall. The flange protector may extend circumferentially from the pressure side wall of the airfoil and may be configured to engage the flange protector of an adjacent turbine vane assembly.

According to another aspect of the present disclosure, a gas path heat shield made from ceramic matrix composite materials includes an airfoil having a pressure side wall and a suction side wall. The suction side wall has a circumferential thickness greater than a circumferential thickness of the pressure side wall. An end wall has a pressure side portion that extends circumferentially from the pressure side wall of the airfoil and a suction side portion that extends circumferentially from the suction side wall of the airfoil. The suction side portion of the end wall is a thickened suction side portion with a radially-measured thickness greater than the pressure side portion of the end wall.

In the illustrative embodiments, a flange protector extends circumferentially from the gas path heat shield.

In the illustrative embodiments, the airfoil and the outer end wall of the gas path heat shield are co-infiltrated with ceramic matrix material such that the gas path heat shield is a one piece, integral component.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
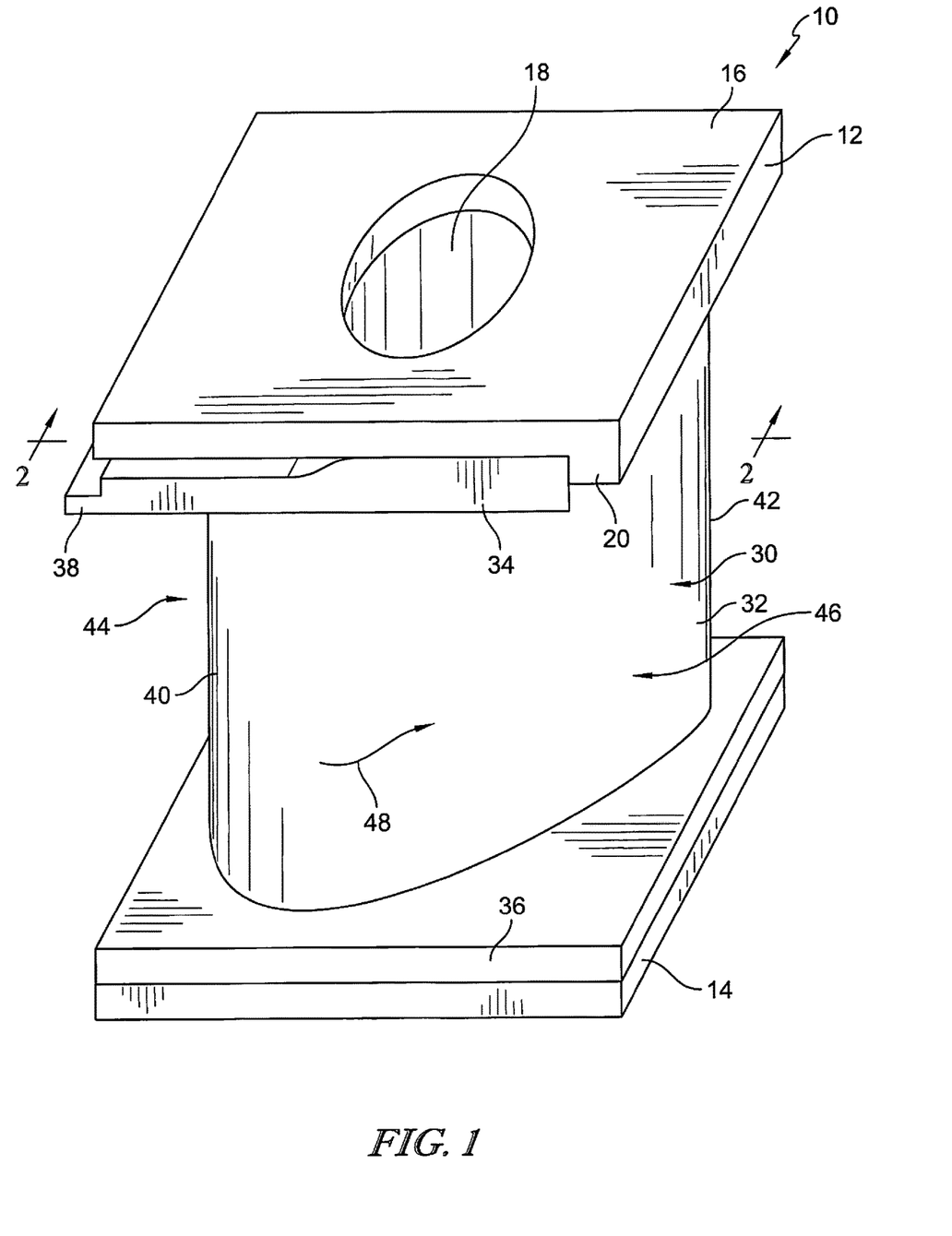
FIG. 1 is a perspective view of an airfoil assembly comprising ceramic materials for use in a gas turbine engine showing that the assembly includes an airfoil body having pressure and suction side for guiding pressurized flow through the gas turbine engine and inner and outer platforms receiving radially inner and outer ends of the airfoil body for connection to provide radial gas flow path surfaces to direct the pressurized flow to pass over the airfoil body.

Ceramic materials, such as fiber-reinforced ceramic matrix composites (CMCs), can be applied in gas turbine engine components to achieve weight reductions while maintaining good tolerance to the high temperature environments of the engine. Referring to FIG. 1, a turbine vane assembly 10 includes a turbine vane support 12 having an inner mount panel 14 and an outer mount panel 16 spaced radially-outwardly from the inner mount panel 14. The inner mount panel 14 and the outer mount panel 16 are formed from a metallic material. A spar 18 extends between the inner mount panel 14 and the outer mount panel 16. A load transfer flange 20 extends radially-inwardly from the outer mount panel 16.

Figure 2:
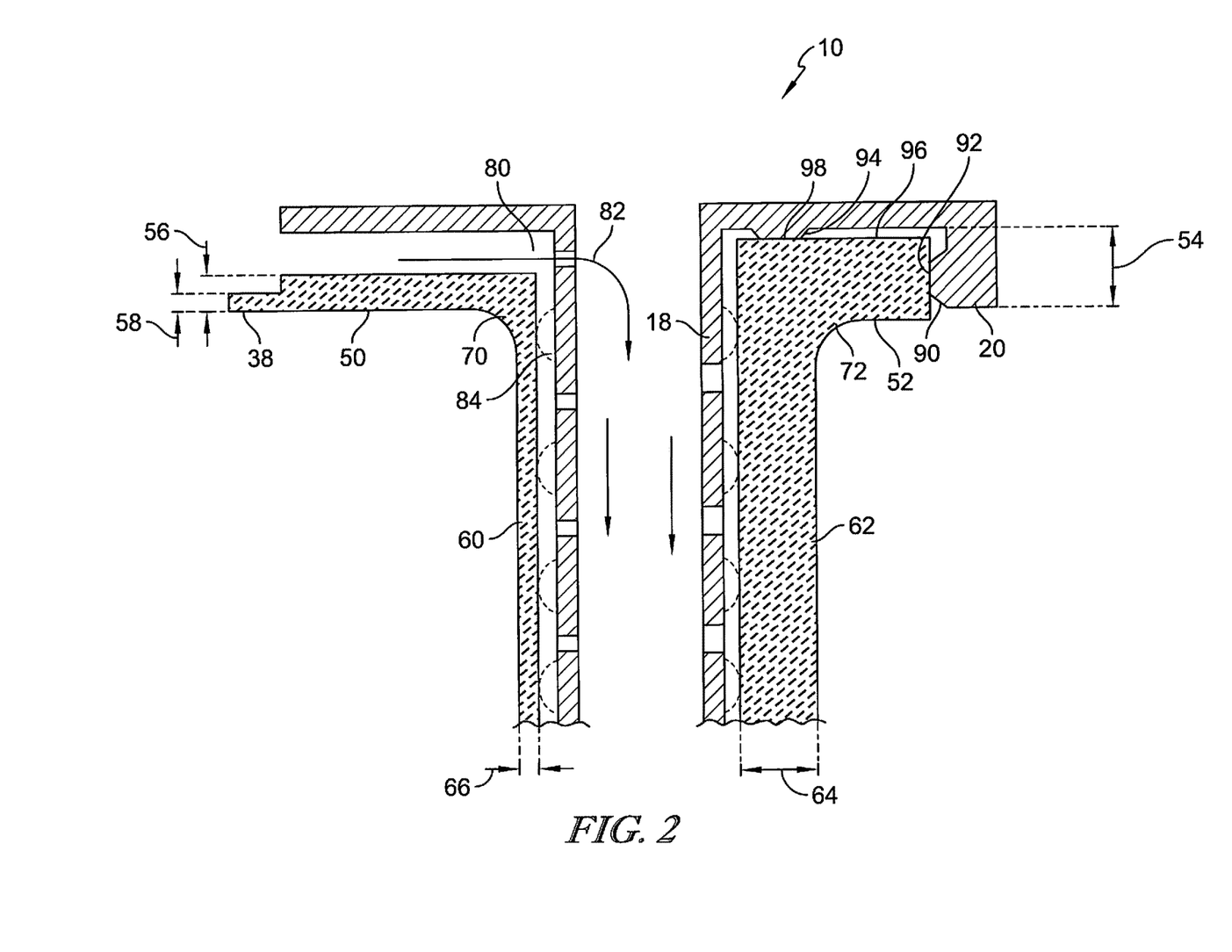
FIG. 2 is a cross-sectional view taken along line 2-2 of the airfoil assembly shown in FIG. 1 and showing a thickness of the ceramic materials on the pressure side and the suction side of the airfoil.
Figure 3:
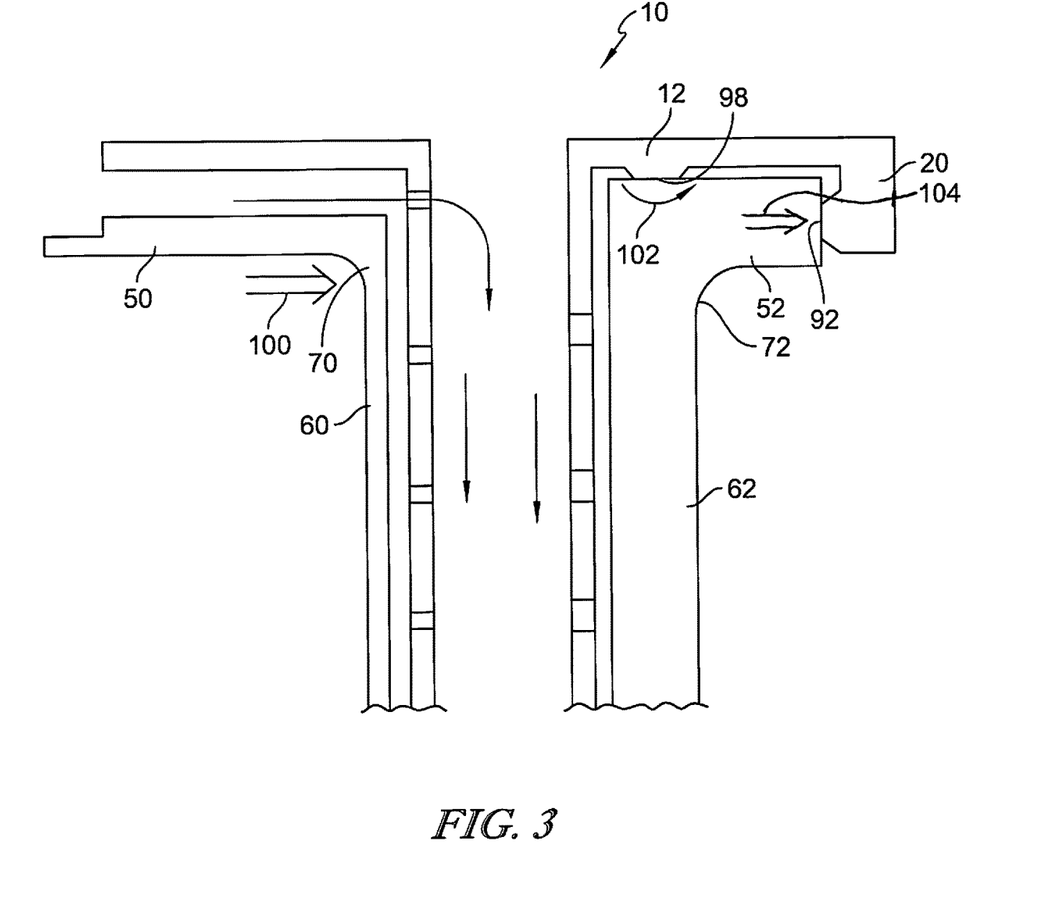
FIG. 3 is a view similar to FIG. 2 showing the aero loads on the pressure side of the airfoil assembly and the resulting compression loads on the suction side of the airfoil assembly.

A gas path heat shield 30 extends between the inner mount panel 14 and the outer mount panel 16 adapted to protect the turbine vane support 12 from hot gasses moving across the turbine vane assembly 10 as shown in FIGS. 1-3. The gas path heat shield 30 is made from ceramic matrix composite materials. The gas path heat shield 30 includes an airfoil 32 extending between an outer end wall 34 and an inner end wall 36. The airfoil 32, the outer end wall 34, and the inner end wall 36 of the gas path heat shield 30 are co-infiltrated with ceramic matrix material such that the gas path heat shield 30 is a one piece, integral component. The outer end wall 34 and positioned radially-inwardly from the outer mount panel 16. The inner end wall 36 is positioned radially-outwardly from the inner mount panel 14. The airfoil 32 is positioned around the spar 18. A flange protector 38 extends circumferentially from the outer end wall 34. The flange protector 38 is configured to position racially-inward of the load transfer flange 20 of an adjacent turbine vane assembly 10 so as to shield the flange 20 from hot gasses.

The airfoil 32 includes a leading edge 40 and a trailing edge 42 spaced apart from the leading edge 40. A pressure side 44 of the airfoil 32 extends from the leading edge 40 to the trailing edge 42. A suction side 46 of the airfoil 32 extends from the leading edge 40 to the trailing edge 42 opposite the pressure side 44. The pressure side 44 and the suction side 46 of the airfoil 32 form a hot gas flow path 48 through the turbine vane assembly 10.

Referring to FIG. 2, the outer end wall 34 of the gas path heat shield 30 includes a pressure side portion 50 and a suction side portion 52. The suction side portion 52 has a radial thickness 54 that is greater than a radial thickness 56 of the pressure side portion 50. The flange protector 38 extends circumferentially from the pressure side portion 50. The flange protector 38 has a radial thickness 58 that is less than the radial thickness 56 of the pressure side portion 50.

The airfoil 32 includes a pressure side wall 60 and a suction side wall 62. The pressure side wall 60 and the suction side wall 62 extend along the spar 18. The suction side wall 62 has a circumferential thickness 64 that is greater than a circumferential thickness 66 of the pressure side wall 60. For purposes of this application, circumferential thickness 64 refers to a radial thickness normal to the central axis of the engine 10 at a given location about the axis of rotation and may not necessarily be arcuate depending on the ultimate geometry of the components. A pressure side fillet 70 extends between the pressure side wall 60 and the pressure side portion 50. A suction side fillet 72 extends between the suction side wall 62 and the suction side portion 52. The suction side fillet 72 has an angular thickness that is greater than an angular thickness of the pressure side fillet 70, wherein the angular thicknesses are measured in a direction between a radial direction and a circumferential direction.

The turbine vane support 12 includes the spar 18 extending radially inward from the outer mount panel 16. The spar 18 extends through the airfoil 32 and is spaced apart from the airfoil 32 to form a cooling channel 80 for cooling air 82 to pass through the turbine vane assembly 10. The spar 18 may include optional load protrusions 84 that contact the airfoil 32 for additional load support within the turbine vane assembly 10. The spar 18 also includes cooling apertures 86 that enable cooling air 82 to pass through the cooling channel 80.

The load transfer flange 20 extends radially-inwardly from the outer mount panel 16 and includes a load transfer pad 90 extending circumferentially towards the suction side portion 52 of the outer end wall 34. The load transfer pad 90 contacts the suction side portion 52 to form a load transfer interface 92. A locating pad 94 extends radially-inwardly from the outer mount panel 16 and engages an upper surface 96 of the suction side portion 52 of the outer end wall 54 to form a locating interface 98.

Referring to FIG. 3, aero loads 100 act on the turbine vane assembly 10 causing tensile forces in the pressure side portion 50, the pressure side wall 60, and the pressure side fillet 70. The increased thickness of the suction side portion 52, the suction side wall 62, and the suction side fillet 72 create compressive forces that relieve the tensile forces on the pressure side portion 50, the pressure side wall 60, and the pressure side fillet 70. That is, the thickened suction side portion 52 of the endwall 34 included in the gas path heat shield 30 engages the load transfer flange 20 of the turbine vane support 12 to provide an aero-load transfer interface 92 configured to carry circumferentially directed aerodynamic loads applied to the pressure side wall 60 of the airfoil 32 from the gas path heat shield to 30 the turbine vane support 12.

A rotating force 102 is applied to the locating interface 98 to prevent rotation of the suction side wall 62 due to the additional compression forces. Additionally, a load 104 is applied to the suction side portion 52 at the load transfer interface 92 to reduce the compression forces on the suction side portion 52. That is, the load is transferred from the suction side portion 52 to the load transfer flange 20. By transferring the loads to the suction side, the ceramic matrix composite material of the gas path heat shield 30 is held in compression rather than in tension.

Figure 4:
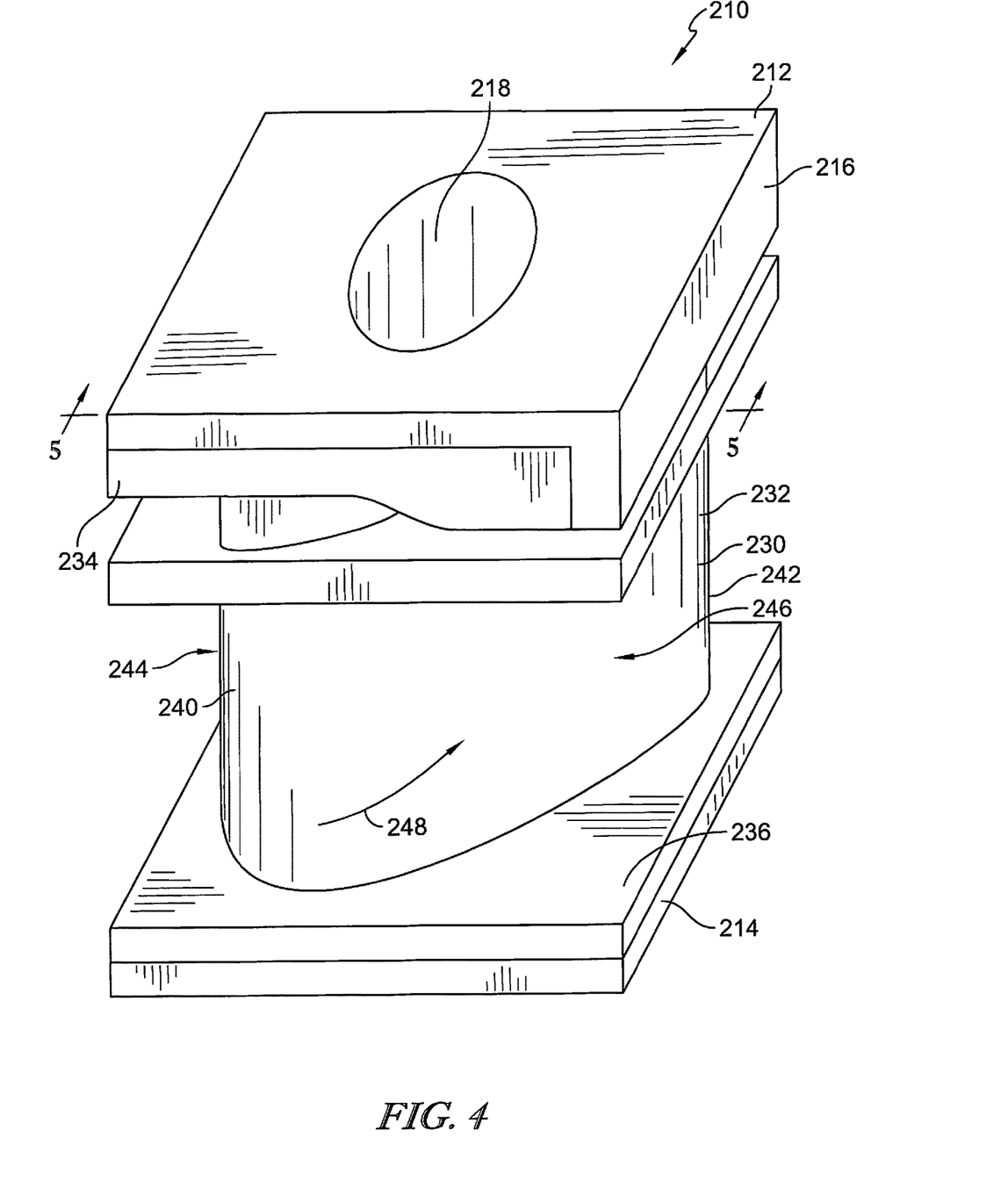
FIG. 4 is a perspective view of another airfoil assembly comprising ceramic materials for use in a gas turbine engine showing that the assembly includes an airfoil body having pressure and suction side for guiding pressurized flow through the gas turbine engine and inner and outer platforms receiving radially inner and outer ends of the airfoil body for connection to provide radial gas flow path surfaces to direct the pressurized flow to pass over the airfoil body.

Referring to FIG. 4, a turbine vane assembly 210 includes a turbine vane support 212 having an inner mount panel 214 and an outer mount panel 216 spaced radially-outwardly from the inner mount panel 214. The inner mount panel 214 and the outer mount panel 216 are formed from a metallic material. A spar 218 extends between the inner mount panel 14 and the outer mount panel 16. A load transfer flange 220 extends radially-inwardly from the outer mount panel 216.

A gas path heat shield 230 extends between the inner mount panel 214 and the outer mount panel 216. The gas path heat shield 230 is made from ceramic matrix composite materials. The gas path heat shield 230 includes an airfoil 232 extending between an outer end wall 234 and an inner end wall 236. The airfoil 232, the outer end wall 234, and the inner end wall 236 of the gas path heat shield 230 are co-infiltrated with ceramic matrix material such that the gas path heat shield 230 is a one piece, integral component. The outer end wall 234 is positioned radially-inwardly from the outer mount panel 216. The inner end wall 236 is positioned radially-outwardly from the inner mount panel 214. The airfoil 232 is positioned around the spar 218.

The airfoil 232 includes a leading edge 240 and a trailing edge 242 spaced apart from the leading edge 240. A pressure side 244 of the airfoil 232 extends from the leading edge 240 to the trailing edge 242. A suction side 246 of the airfoil 232 extends from the leading edge 240 to the trailing edge 242 opposite the pressure side 244. The pressure side 244 and the suction side 246 of the airfoil 232 form a hot gas flow path 248 through the turbine vane assembly 210.

Figure 5:
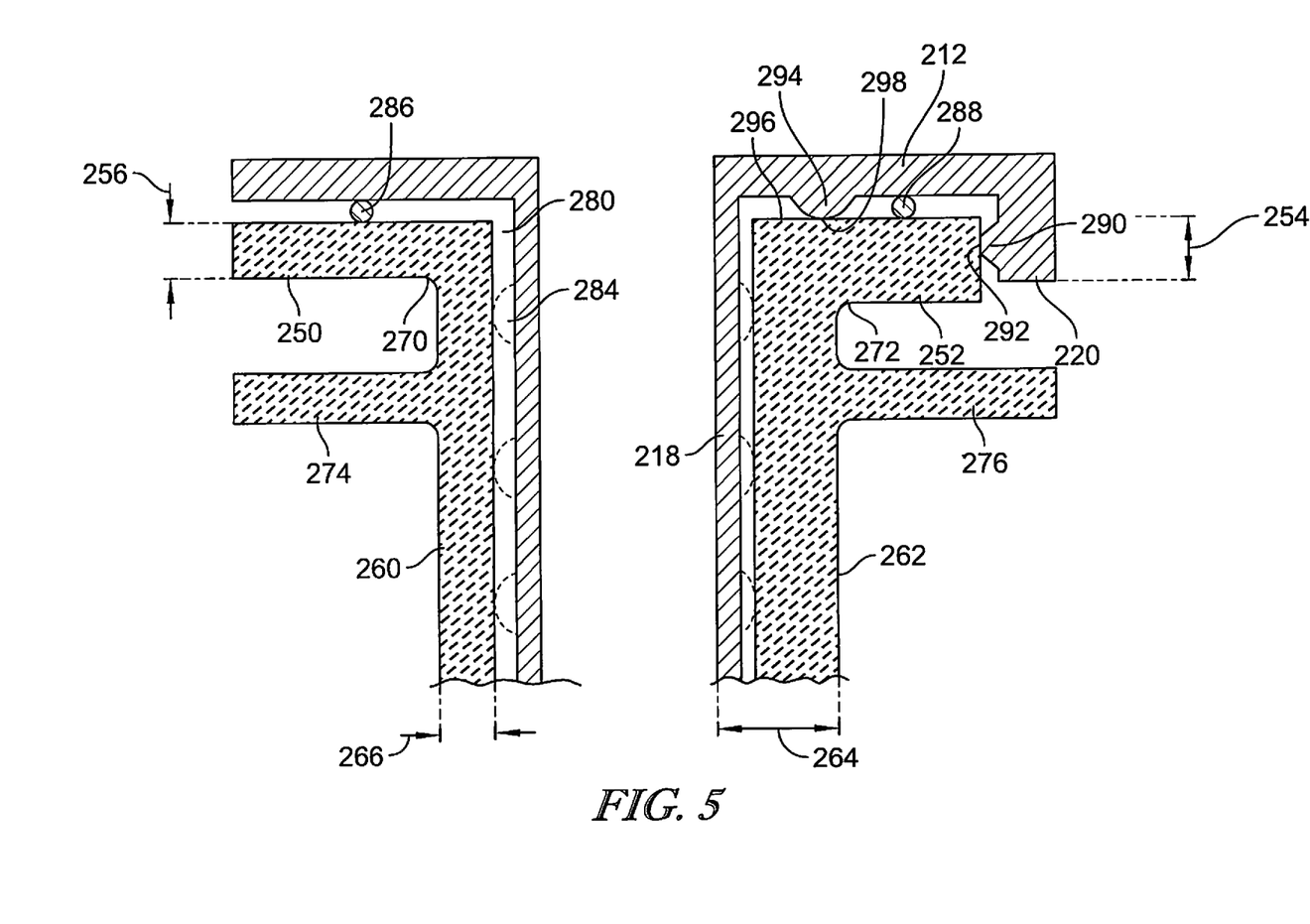
FIG. 5 is a cross-sectional view taken along line 5-5 of the airfoil assembly shown in FIG. 4 and showing a thickness of the ceramic materials on the pressure side and the suction side of the airfoil.

Referring to FIG. 5, the outer end wall 234 of the gas path heat shield 230 includes a pressure side portion 250 and a suction side portion 252. The suction side portion 252 has a radial thickness 254 that is greater than a radial thickness 256 of the pressure side portion 250. The airfoil 232 includes a pressure side wall 260 and a suction side wall 262. The pressure side wall 260 and the suction side wall 262 extend along the spar 218. The suction side wall 262 has a circumferential thickness 264 that is greater than a circumferential thickness 266 of the pressure side wall 260.

A pressure side fillet 270 extends between the pressure side wall 260 and the pressure side portion 250. A suction side fillet 272 extends between the suction side wall 262 and the suction side portion 252. The suction side fillet 272 has an angular thickness that is greater than an angular thickness of the pressure side fillet 270, wherein the angular thicknesses are measured in a direction between a radial direction and a circumferential direction.

A flange protector 274 extends circumferentially from the pressure side wall 260. A flange protector 276 extends circumferentially from the suction side wall 262. The flange protector 274 is configured to engage the flange protector 276 of an adjacent turbine vane assembly 210.

The turbine vane support 212 includes the spar 218 extending radially inward from the outer mount panel 216. The spar 218 extends through the airfoil 232 and is spaced apart from the airfoil 232 to form a cooling channel 280 for cooling air to pass through the turbine vane assembly 210. The spar 218 may include optional load protrusions 284 that contact the airfoil 232 for additional load support within the turbine vane assembly 210.

A seal 286 is positioned between the outer mount panel 216 and the pressure side portion 250. Another seal 288 is positioned between the outer mount panel 216 and the suction side portion 252.

The load transfer flange 220 extends radially-inwardly from the outer mount panel 216 and includes a load transfer pad 290 extending circumferentially towards the suction side portion 252 of the outer end wall 234. The load transfer pad 290 contacts the suction side portion 252 to form a load transfer interface 292. A locating pad 294 extends radially-inwardly from the outer mount panel 216 and engages an upper surface 296 of the suction side portion 252 of the outer end wall 254 to form a locating interface 298.

Figure 6:
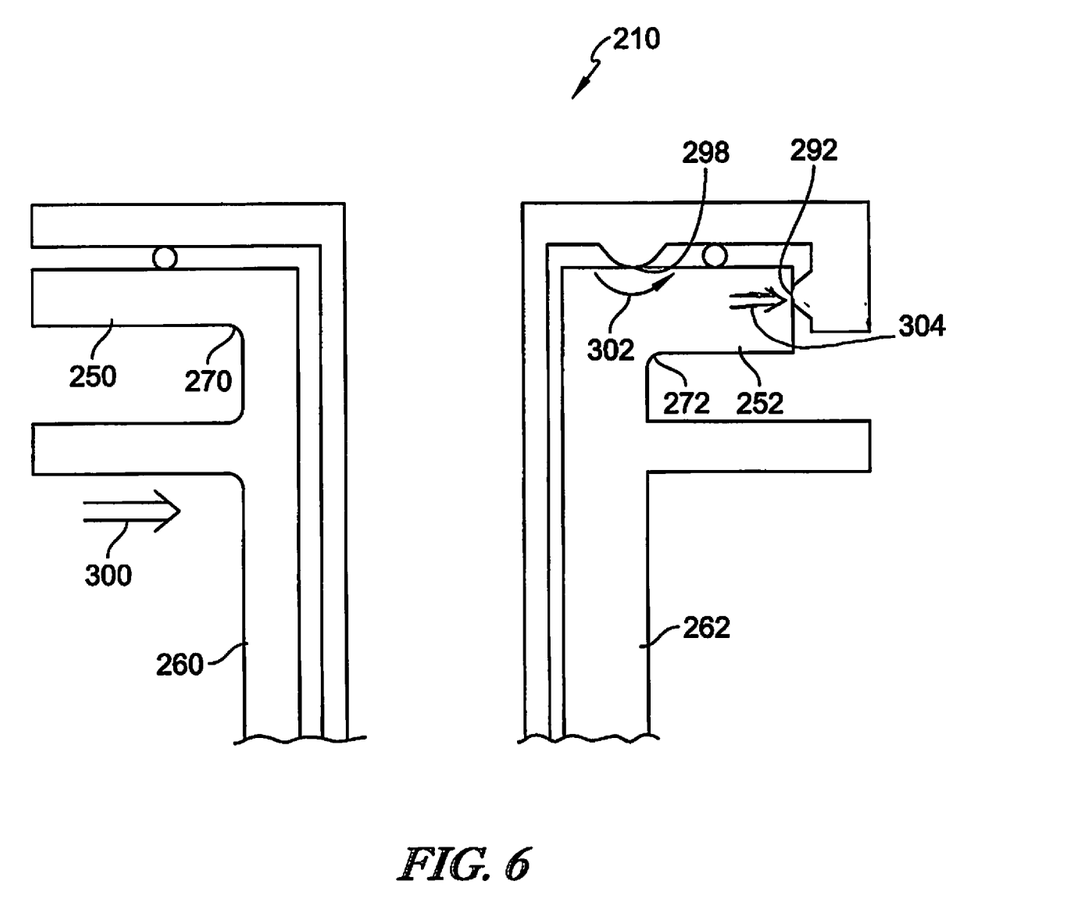
FIG. 6 is a view similar to FIG. 5 showing the aero loads on the pressure side of the airfoil assembly and the resulting compression loads on the suction side of the airfoil assembly.

Referring to FIG. 6, aero loads 300 act on the turbine vane assembly 210 causing tensile forces in the pressure side portion 250, the pressure side wall 260, and the pressure side fillet 270. The increased thickness of the suction side portion 252, the suction side wall 262, and the suction side fillet 272 create compressive forces that relieve the tensile forces on the pressure side portion 250, the pressure side wall 260, and the pressure side fillet 270. That is, the thickened suction side portion 252 of the endwall 234 included in the gas path heat shield 230 engages the load transfer flange 220 of the turbine vane support 212 to provide an aero-load transfer interface 292 configured to carry circumferentially directed aerodynamic loads applied to the pressure side wall 260 of the airfoil 232 from the gas path heat shield to 230 the turbine vane support 212.

A rotating force 302 is applied to the locating interface 298 to prevent rotation of the suction side wall 262 due to the additional compression forces. Additionally, a load 304 is applied to the suction side portion 252 at the load transfer interface 292 to reduce the compression forces on the suction side portion 252. That is, the load is transferred from the suction side portion 252 to the load transfer flange 220. By transferring the loads to the suction side, the ceramic matrix composite material of the gas path heat shield 230 is held in compression rather than in tension.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly for a gas turbine engine, the assembly comprising:
    a turbine vane support made from metallic materials, the turbine vane support including an outer mount panel that extends at least partway around a central axis and a load transfer flange that extends radially-inwardly from the outer mount panel, and
    a gas path heat shield made from ceramic matrix composite materials, the gas path heat shield including (i) an airfoil having a pressure side wall and a suction side wall and (ii) an end wall having a pressure side portion that extends circumferentially from the pressure side wall of the airfoil and a suction side portion that extends circumferentially from the suction side wall of the airfoil, the suction side portion of the end wall being a thickened suction side portion with a radially-measured thickness greater than the pressure side portion of the end wall, wherein the thickened suction side portion of the endwall included in the gas path heat shield engages the load transfer flange of the turbine vane support to provide an aero-load transfer interface configured to carry circumferentially directed aerodynamic loads applied to the pressure side wall of the airfoil from the gas path heat shield to the turbine vane support,
    wherein the load transfer flange includes a load transfer pad extending circumferentially towards the thickened suction side portion of the end wall to form a load transfer interface, and wherein the thickened suction side portion of the end wall engages the load transfer pad.

2. The turbine vane assembly of claim 1, wherein the suction side wall included in the airfoil has a circumferential thickness greater than a circumferential thickness of the pressure side wall included in the airfoil.

3. The turbine vane assembly of claim 2, wherein the airfoil and the outer end wall of the gas path heat shield are co-infiltrated with ceramic matrix material such that the gas path heat shield is a one piece, integral component.

4. The turbine vane assembly of claim 1, wherein the turbine vane support includes a spar that extends radially-inwardly from the mount panel through the gas path heat shield.

5. The turbine vane assembly of claim 1, further comprising:
    a pressure side fillet extending between the pressure side wall of the airfoil and the pressure portion of the endwall, and
    a suction side fillet extending between the suction side wall of the airfoil and the suction portion of the endwall, wherein the suction side fillet is a thickened fillet with a angularly-measured thickness greater than the pressure side fillet, wherein the angularly-measured thickness is measured at an angle between a circumferential direction and a radial direction.

6. The turbine vane assembly of claim 1, further comprising a locating pad extending radially-inwardly from the outer mount panel and engaging a radially-outward surface of the suction side portion of the end wall.

7. The turbine vane assembly of claim 1, further comprising a flange protector wall extending circumferentially from the gas path heat shield.

8. The turbine vane assembly of claim 7, wherein the flange protector wall extends circumferentially from the pressure side portion of the endwall and is configured to engage the load transfer flange of an adjacent turbine vane assembly.

9. The turbine vane assembly of claim 8, wherein the flange protector wall has a circumferential thickness less than a circumferential thickness of the pressure side portion of the endwall.

10. The turbine vane assembly of claim 7, wherein the flange protector wall extends circumferentially from the pressure side wall of the airfoil and is configured to engage the load transfer flange of an adjacent turbine vane assembly.

11. The turbine vane assembly of claim 1, wherein a circumferentially facing wall of the thickened suction side portion of the endwall engages a circumferentially facing wall of the load transfer flange.

12. A turbine vane assembly for a gas turbine engine, the assembly comprising:
    a turbine vane support made from metallic materials, the turbine vane support including an outer mount panel that extends at least partway around a central axis and a load transfer flange that extends radially-inwardly from the outer mount panel,
    a gas path heat shield made from ceramic matrix composite materials, the gas path heat shield including (i) an airfoil having a pressure side wall and a suction side wall, the suction side wall having a circumferential thickness greater than a circumferential thickness of the pressure side wall and (ii) an end wall having a pressure side portion that extends circumferentially from the pressure side wall of the airfoil and a suction side portion that extends circumferentially from the suction side wall of the airfoil, the suction side portion of the end wall being a thickened suction side portion with a radially-measured thickness greater than the pressure side portion of the end wall, wherein the thickened suction side portion of the endwall included in the gas path heat shield engages the load transfer flange of the turbine vane support,
    a flange protector wall extending circumferentially from a circumferential face of the pressure side portion of the endwall and configured to engage the load transfer flange of an adjacent turbine vane assembly, and a spar that extends radially-inwardly from the mount panel through the gas path heat shield wherein the load transfer flange includes a load transfer pad extending circumferentially towards the thickened suction side portion of the end wall to form a load transfer interface, and wherein the thickened suction side portion of the end wall engages the load transfer pad.

13. The turbine vane assembly of claim 12, wherein the airfoil and the outer end wall of the gas path heat shield are co-infiltrated with ceramic matrix material such that the gas path heat shield is a one piece, integral component.

14. The turbine vane assembly of claim 12, further comprising:
a pressure side fillet extending between the pressure side wall of the airfoil and the pressure portion of the endwall, and
a suction side fillet extending between the suction side wall of the airfoil and the suction portion of the endwall, wherein the suction side fillet is a thickened fillet with a angularly-measured thickness greater than the pressure side fillet, wherein the angularly-measured thickness is measured at an angle between a circumferential direction and a radial direction.

15. The turbine vane assembly of claim 12, further comprising a locating pad extending radially-inwardly from the outer mount panel and engaging a radially-outward surface of the suction side portion of the end wall.

16. The turbine vane assembly of claim 12, wherein the flange protector wall has a circumferential thickness less than a circumferential thickness of the pressure side portion of the endwall.

17. A turbine vane assembly for a gas turbine engine, the assembly comprising:
a turbine vane support made from metallic materials, the turbine vane support including an outer mount panel that extends at least partway around a central axis and a load transfer flange that extends radially-inwardly from the outer mount panel, and
a gas path heat shield made from ceramic matrix composite materials, the gas path heat shield comprising:
an airfoil having a pressure side wall and a suction side wall, the suction side wall having a circumferential thickness greater than a circumferential thickness of the pressure side wall, and
an end wall having a pressure side portion that extends circumferentially from the pressure side wall of the airfoil and a suction side portion that extends circumferentially from the suction side wall of the airfoil, the suction side portion of the end wall being a thickened suction side portion with a radially-measured thickness greater than the pressure side portion of the end wall, the thickened suction side portion of the end wall engages the load transfer flange of the turbine vane support to provide an aero-load transfer interface configured to carry circumferentially directed aerodynamic loads applied to the pressure side wall of the airfoil from the gas path heat shield to the turbine vane support,
wherein the load transfer flange includes a load transfer pad extending circumferentially towards the thickened suction side portion of the end wall to form a load transfer interface, and
wherein the thickened suction side portion of the end wall engages the load transfer pad.

18. The turbine vane assembly of claim 17, further comprising a flange protector wall extending circumferentially from the gas path heat shield.

19. The turbine vane assembly of claim 17, wherein the airfoil and the outer end wall of the gas path heat shield are co-infiltrated with ceramic matrix material such that the gas path heat shield is a one piece, integral component.

* * * * *